Patented May 1, 1934

1,956,837

UNITED STATES PATENT OFFICE 1,956,837

SOUND RECORD OF CONDENSATION PRODUCTS OF POLYVINYL ALCOHOL-ALDEHYDE CONDENSATION PRODUCT

Fritz Schmidt, Troisdorf, near Cologne-on-the-Rhine, Germany

No Drawing. Application October 29, 1931, Serial No. 571,944. In Germany October 30, 1930

2 Claims. (Cl. 106—1.5)

My invention relates to sound records and it is an object of my invention to provide a sound record which is without the drawbacks of the usual records, such as fragility, brittleness and heaviness.

To this end I make the records from condensation-products which are obtained of polyvinyl alcohols and aldehydes in the presence of acids or substances with acid reaction.

Commercial records for the major part consist of shellac and a high percentage of filler. Such plates possess the above-mentioned poor properties.

In my novel records fillers are dispensed with, but preferably a high-boiling plastification agent is added. The records are molded under heat and pressure.

50 kg. of a polyvinylalcohol-formaldehyde condensation product are kneaded in a kneading apparatus with 50 kg. of a solution of alcohol and benzene (2:1) until the mass has become homogeneous throughout. 2.5 kg. of a high boiling plasticizing agent may be added and incorporated with the mass if desired. As an example of a suitable plasticizing agent the iso-butyl ester of phthalic acid may be mentioned. The homogeneous mass is then further worked up in accordance with the methods employed in the production of solid celluloid-like articles.

My novel records are practically unbreakable on account of the strength and toughness of the new material and will last indefinitely. They may be made as thin as desired and in flexible condition, and, owing to their low weight, are particularly suitable for being carried in portmanteau talking machines.

The records are cheap because they require so little material and the sound reproduction is very pure on account of the absence of filler, while the wear is reduced a minimum because of the toughness of the material.

I claim:

1. A sound record consisting of a polyvinyl alcohol-aldehyde condensation product.
2. A sound record consisting of a polyvinyl alcohol-aldehyde condensation product and containing a high-boiling plastification agent.

FRITZ SCHMIDT.